United States Patent [19]
Marik et al.

[11] Patent Number: 5,787,256
[45] Date of Patent: Jul. 28, 1998

[54] APPARATUS AND METHOD FOR DATA COMMUNICATION BETWEEN NODES

[75] Inventors: Mark Douglas Marik, Charlotte; Robert Anthony Palo, Concord, both of N.C.; Susan E. Waefler, Del Ray Beach, Fla.

[73] Assignee: International Business Machines Corporation, Armonk, N.Y.

[21] Appl. No.: 692,553

[22] Filed: Aug. 6, 1996

Related U.S. Application Data

[63] Continuation of Ser. No. 1,870, Jan. 8, 1993, abandoned.

[51] Int. Cl.$^6$ .................................................. G06F 13/00
[52] U.S. Cl. ........................... 395/200.68; 370/474
[58] Field of Search ............................ 395/200.3, 200.62, 395/200.63, 200.68, 800.01, 800.11, 800.16, 670.825, 828, 835, 840; 370/351, 229, 400, 431, 464, 474; 340/825, 825.03, 826, 827, 825.06, 825.5

[56] References Cited

U.S. PATENT DOCUMENTS

| | | | |
|---|---|---|---|
| 3,810,101 | 5/1974 | Avery | 395/325 |
| 4,097,695 | 6/1978 | Grace et al. | 370/92 |
| 4,325,147 | 4/1982 | Rothlauf | 370/91 |
| 4,766,534 | 8/1988 | De Benedictis | 395/200 |
| 4,833,672 | 5/1989 | Steely | 370/85.1 |
| 4,845,744 | 7/1989 | De Benedictis | 379/221 |
| 4,907,225 | 3/1990 | Gulick et al. | 370/94.1 |
| 4,910,669 | 3/1990 | Gorin et al. | 395/800 |
| 4,920,484 | 4/1990 | Ranade | 395/200 |
| 5,117,430 | 5/1992 | Berglund | 370/85.1 |
| 5,245,609 | 9/1993 | Ofek et al. | 370/94.3 |

FOREIGN PATENT DOCUMENTS

| | | |
|---|---|---|
| 0018754 | 11/1980 | European Pat. Off. . |
| 49-98504 | 1/1973 | Japan . |
| 9114229 | 9/1991 | WIPO . |

OTHER PUBLICATIONS

"Optical Data Multiplex Transmission System", Dainichi—Nippon Cables Rev., No. 71, pp. 49–57, Feb. 1986.

*Primary Examiner*—Alpesh M. Shah
*Attorney, Agent, or Firm*—A. P. Tennent

[57] ABSTRACT

An apparatus and method for communicating information between a computer and a plurality of peripherals along a plurality of communication channels is disclosed. The computer and peripherals are connected in a succession of stages (cascaded), in a tree-like (hierarchical) communication network configuration. Peripherals in the network include an associated communication unit which is responsible for transmitting and/or receiving data communicated on a communication channel. The communication unit facilitates the transfer of data to, and the receipt of data from, the unit's parent, and also facilitates the transfer of data to, and the receipt of data from, any child units. In the invented method, each communication unit, in parallel, composes those individual messages received from child units into a single composite message and transmits the composite message to the communication unit's parent. The parent, in turn, composes those individual or composite messages it has received into a single composite message and transmits the contents to its parent. This continues until a single composite message is transmitted to the computer for processing. The computer decomposes a composite message into its constituent individual messages and processes individual messages. The computer can also transmit messages to peripherals in a reciprocal manner, that is, by composing a single composite message to be transmitted to the first stage communication unit and thereafter decomposed and distributed to designated nodes within the network.

9 Claims, 10 Drawing Sheets

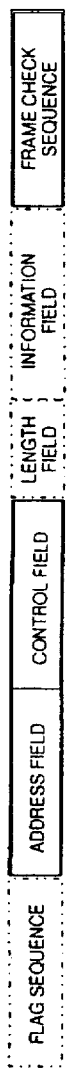
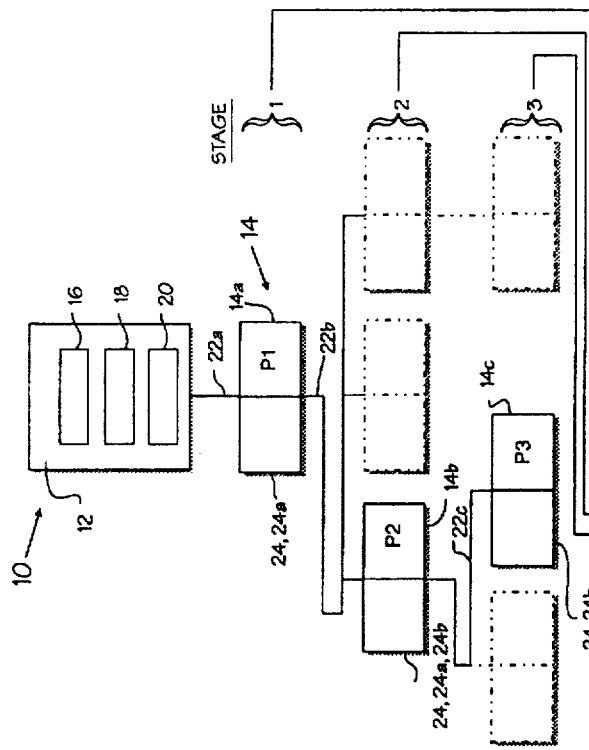
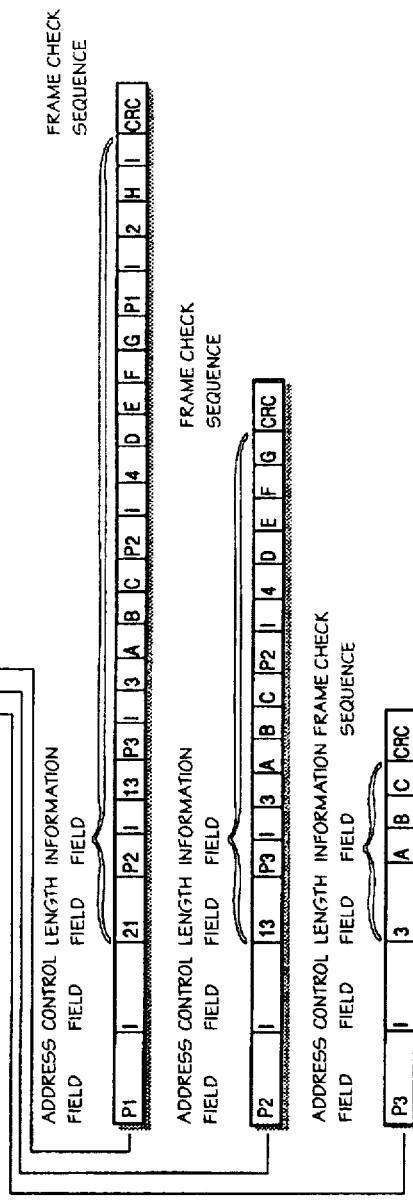
FIG. 4
FIG. 5

APPARATUS AND METHOD FOR DATA COMMUNICATION BETWEEN NODES

This is a continuation of application Ser. No. 08/001,870, filed Jan. 8, 1993, now abandoned.

BACKGROUND OF THE INVENTION

1. Field Of The Invention

The present invention relates to an apparatus and method for data communication between nodes. More particularly, the present invention relates to an apparatus and method for communicating data from a node at one location to a node at another location within a communications network.

2. Description of Related Art

Communication of data from a node at one location to a node at another location involves some form of a communications network made up of a set of nodes and communication channels between those nodes. A channel is a path for transmitting data between nodes. A particular node may be a computer, peripheral, or some other data receiver/transmitter.

For purposes herein, "computer" includes a device capable of meeting the Turing Test, "peripheral" includes an ancillary device capable of receiving and/or transmitting data, and "data" includes a representation of information capable of being communicated within a communication network. The Turing Test is a well-known computer science concept and is explained in Encyclopedia of Computer Science, Ed. Anthony Ralston, ISBN 0-88405-321-0, which is specifically incorporated herein by reference.

Typically, digital data is transmitted on a channel from one node to another in the form of a series of binary (0 or 1) signals. The two basic ways of sending those signals across the channel are to send one signal at a time (serial) or to send more than one signal at a time (parallel). Two-way simultaneous data transmission across a channel is referred to as "duplex" transmission (e.g., as on a two-lane highway). In "half-duplex" transmission, two-way transmission is possible, but not simultaneously (e.g., as on a one-lane road alternately used by cars travelling in both directions). Finally, "simplex" transmission refers to one-way data transmission across a channel (e.g., as on a one-way street).

A communication system in which signals sent across the channel are synchronized between two nodes, typically by synchronized timing pulses, is referred to as a "synchronous" system. In an "asynchronous" system, on the other hand, signals are sent across the channel at irregular periods in combination with a start code before the signals and a stop code after the signals.

Nodes in a communication network may be connected to one another in a number of different configurations. One configuration, known as "point to point", is to directly connect a source node with one or more destination nodes, wherein each source-destination connection requires a separate channel, and no destination nodes are connected to each other. Another configuration, known as "multidrop", is to connect a source node with at least two destination nodes along a single channel. Data is communicated from the source node to a particular destination node by labeling the data with the location (address) of the desired node. All destination nodes connected to the source node are responsible for recognizing their location (address) from the data transmission. One other configuration, known as "distributed", is an extension of the point to point connection. In a distributed network, destination nodes may be connected to other destination nodes, thereby permitting indirect connection of nodes. In practice these basic configurations are combined to form hybrid network configurations based on design requirements.

It is common in communication networks to use multiplexing in order to reduce cost and increase reliability in transmitting data. In general, "multiplexing" refers to the interleaving or simultaneous transmission of two or more messages along a single channel. A "multiplexer" is a device capable of performing multiplexing. The two basic types of multiplexing are time division multiplexing and frequency division multiplexing. Time division multiplexing involves allocating a channel for a particular period of time to two or more nodes. Frequency division multiplexing involves allocating a different frequency within a channel to each of a plurality of nodes.

In order to avoid conflict over the communication of data along a time division multiplexed channel between a source node and a plurality of destination nodes, some traffic control technique is desirable. One such technique is referred to as "polling" and involves having the source node selectively interrogate each destination node in order to determine whether a selected destination node is ready to send or receive data. A normal precursor to sending or receiving data is a "handshaking" sequence. In analogous fashion to a human handshake, data communication handshaking refers to an exchange of predetermined signals between nodes to establish that communication may commence.

One type of computer system is a personal computer system, which comprises a computer connected to one or more peripherals (e.g., keyboard, display, printer), which, for purposes herein, shall be an example of a communication network. A communication network may also include computer networks such as local area networks (LANs) and wide area networks (WANs). Communication in a personal computer system between the computer and a peripheral is usually accomplished by asynchronous serial transmission of data. This type of communication is preferred because, unlike parallel transmission or synchronous communication, it is relatively easy and inexpensive to implement. In addition, standards have evolved for asynchronous serial data communication, such as the Electronics Industry Association (EIA) RS-232C, RS-442, RS-449, and RS-485 standards, and the TELETYPE 20 mA current-loop standard.

In the prior art, connecting a plurality of peripherals to a computer typically requires a direct asynchronous serial communication connection between the computer and each peripheral or, in other words, point to point communication. Further, some mechanism, such as either polling or interrupting of all attached peripherals, is also required to determine which particular peripheral has some data to communicate with the computer at a given time. This mechanism is often accomplished by a computer program running under the control of the central processing unit (CPU) of the computer. Thus, the task of managing communication between the computer and the peripherals is assumed by the computer. Many peripherals and frequent polling results in an inefficient use of the computer since repeated polling of each attached peripheral diverts attention from main-processing tasks, such as processing application programs, to ancillary input/output tasks. Thus, a key problem is that of communicating between a computer and a number of peripherals. Although the peripherals may often be inactive or dormant, they need prompt communication service when they are active.

An Optical Data Multiplex Transmission System is discussed in Dainichi-Nippon Cables Rev., No. 71, pp. 49-57, Feb. 1986 (hereinafter the "Dainichi article"). The Dainichi article indicates that by connecting several of the disclosed multiplexers (and associated terminals) in cascade, multi-drop data transmission can be created. FIG. 18 in the Dainichi article shows a computer (PC-9801) connected via an RS-232C cable to a first multiplexer (MP-1000A), and a set of other multiplexers (MP-1000Bs) connected in multi-drop fashion to the first multiplexer. Data in a predetermined format is communicated between the multiplexers over optical fiber cables. As illustrated in FIGS. 19 and 20 of the Dainichi article, the data, which includes a terminal identifier, is forwarded from one multiplexer to another until delivered to the identified terminal. Although the system disclosed in this article does provide some offloading of input/output functions from the CPU to the multiplexers, one disadvantage is that the system cannot be configured in a succession of stages (cascaded) along a plurality of communication channels, in a tree-like (hierarchical) communication network configuration. Thus, the system provides only limited distributed processing capability.

It is known in the art of widely distributed communication networks to employ a technique known as "packet switching" in order to reduce transmission costs. In general, packet switching involves packaging formatted data together with an address of a node in a network (i.e., a packet) and communicating the packet within the network. Historically, packet switching has been employed in long distance communication networks having mainframe computers and minicomputers as nodes. Some of the nodes, typically minicomputers, perform a range of packet switching functions such as managing transmission lines, switching packets, and performing packet assembly and disassembly activities. A significant disadvantage and limitation of packet switching is that it requires expensive and complex computer hardware and software.

SUMMARY OF THE INVENTION

The present invention overcomes the disadvantages and limitations of the related art by providing an apparatus and method employed with a computer and a plurality of peripherals which are connected in a succession of stages (cascaded) along a plurality of communication channels, in a tree-like (hierarchical) communication network configuration. Peripherals in the network include an associated communication unit which is responsible for transmitting and/or receiving data communicated on a communication channel, and which is capable of operating in parallel with other communication units in the network. A child communication unit ("child unit") connects to at least one communication unit located in the prior stage of the network hierarchy; a parent communication unit ("parent unit") connects to one or more child units located in the next stage of the hierarchy. As used herein, the term "parent," as opposed to "parent unit," includes the computer, and may also be used to specify a relationship between peripherals. Similarly, the term "child," as opposed to "child unit," may be used to specify a relationship between peripherals. The computer is treated as the parent of the first stage communication unit, and the first stage communication unit is treated as the child unit of the computer. A communication unit includes signaling conversion means such as a Universal Asynchronous Receiver/Transmitter (UART), or other means for parallel-to-serial and serial-to-parallel signaling conversion, data controlling means, such as a processor, a memory, a multiplexer, and may also include means for specially controlling the associated peripheral. The data controlling means within the communication unit facilitates the transfer of data to, and the receipt of data from, a parent, and also facilitates the transfer of data to, and the receipt of data from, any child units.

The method of the present invention includes the steps of establishing a communication link between a communication unit and its parent; communicating a first message, if any, between the communication unit and the parent; establishing a communication link between the communication unit and a child unit; communicating a second message, if any, between the communication unit and the child unit; and processing messages at the communication unit. An individual message to be sent from a particular peripheral to the computer is stored in the memory of the peripheral's associated communication unit. The memory of the communication unit may also include messages received from the communication unit's children. The communication unit, acting as a composer, composes those messages in its memory into a single composite message, stores the composite message in its memory, and transmits the composite message to its parent. This process continues in each stage of the network hierarchy until the computer receives a composite message. The computer includes means for decomposing the composite message into its constituent individual messages, such as a parser. The computer then appropriately processes individual messages (e.g., keystrokes sent from a keyboard peripheral). The computer can also transmit messages to peripherals in a reciprocal manner, that is, by composing a single composite message to be transmitted to the first stage communication unit and thereafter decomposed and distributed to designated nodes within the network.

An advantage of the invention is to provide an apparatus and method for communicating information between a computer and a plurality of peripherals along a plurality of communication channels in a less cumbersome and less expensive manner than heretofore known.

Another advantage of the invention is to provide an apparatus and method for communicating information between a computer and a plurality of peripherals, wherein the computer and a first stage peripheral are connected via a single communication channel and the remaining peripherals are connected to the first stage peripheral in a succession of stages (cascaded) in a tree-like (hierarchical) communication network configuration.

Another advantage of the invention is to provide an apparatus and method for distributing input/output functions to peripherals so as to minimize the need for the computer to perform those functions.

Another advantage of the invention is to provide an apparatus and method which minimizes memory space and processing time requirements for communicating information between a computer and a plurality of peripherals.

The foregoing and other objects and advantages of the present invention will be apparent to those skilled in the art of data communication in view of the accompanying drawings, description of the invention, and appended claims.

BRIEF DESCRIPTION OF THE DRAWINGS

FIG. 4 is a block diagram depicting the preferred embodiment of the composition of a message.

FIG. 5 is a diagram depicting upstream and downstream communication of messages among the nodes shown in FIG. 1.

DESCRIPTION OF THE PREFERRED EMBODIMENT

Figure 1:
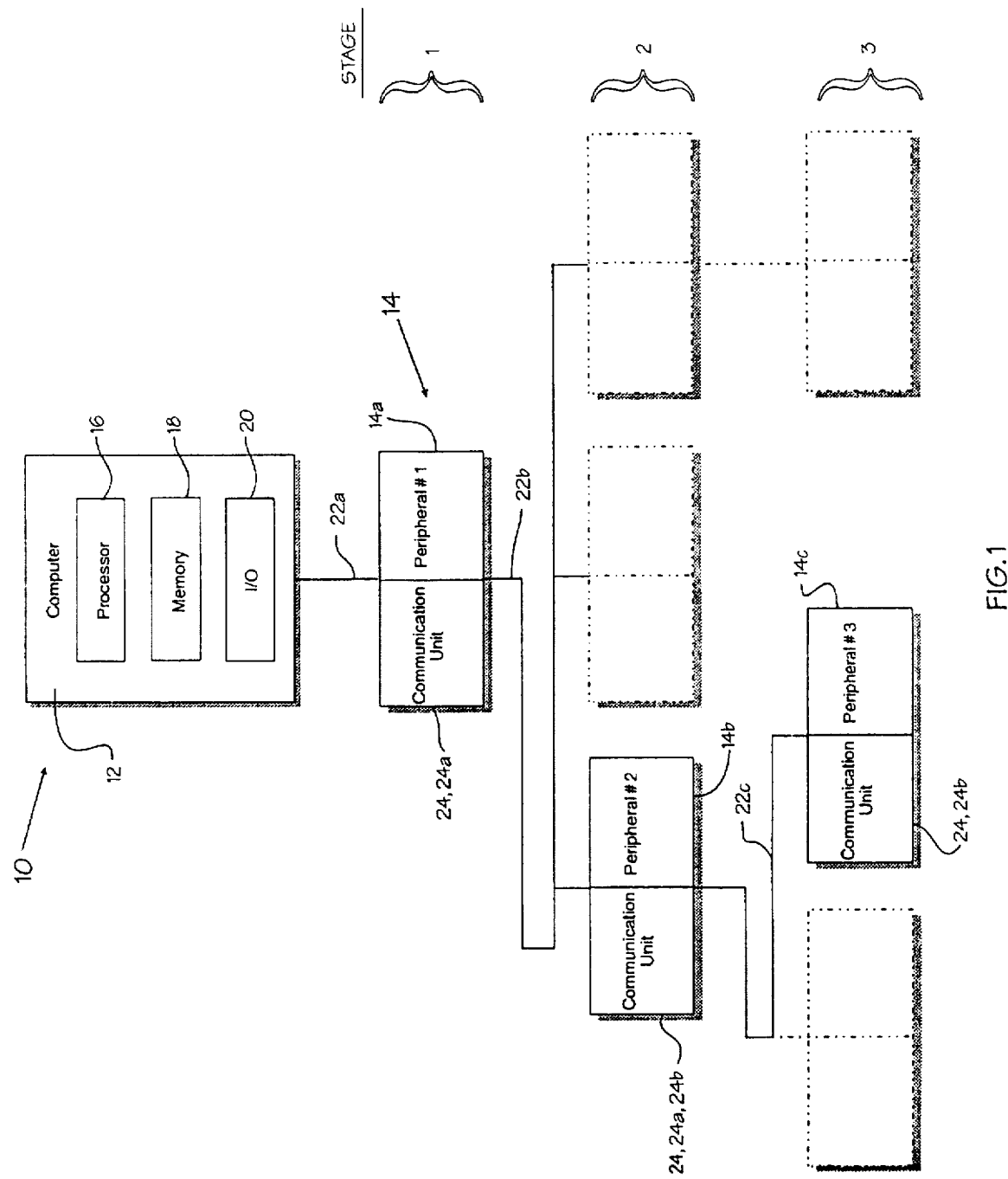
FIG. 1 is a general block diagram depicting a computer and a plurality of peripherals configured in accordance with the present invention.

Referring now to FIG. 1, a computer system 10 is depicted which includes a computer 12 connected to a plurality of peripherals 14. The computer 12 comprises a central processor 16, at least one memory 18, and means 20 for providing input to and output from the central processor and the memory. An example of the computer 12 is an IBM® Personal System/2® (PS/2®) computer. Three peripherals 14a, 14b, and 14c are illustrated in FIG. 1. In general, peripherals 14 may include a variety of devices, such as computers, keyboards, displays, printers, mice, light pens, touch screens, and scanners.

The computer 12 and the peripherals 14 are shown connected in a succession of, stages (cascaded) along a plurality of communication channels 22. Three communication channels are illustrated in FIG. 1, 22a, 22b, and 22c. The present invention is described and shown in its preferred embodiment with an asynchronous serial communication channel 22a operating under the RS-232C standard in half-duplex mode, although it is also applicable to synchronous communication, parallel communication, communication protocols other than RS-232C, and transmission modes other than half-duplex. As shown in FIG. 1, the first stage comprises a peripheral 14a connected to the computer 12 for communication. The second stage comprises one or more peripherals connected in multidrop fashion to the first stage peripheral 14a. Each second stage peripheral may in turn be connected in multidrop fashion to one or more peripherals to form a third stage. Successive stages may be constructed in a similar manner. The result is a tree-like (hierarchical) communication network configuration. The configuration is a hybrid of the multidrop and distributed types of network configurations.

As depicted in FIG. 1, each peripheral 14 in the network may include an associated communication unit 24 which is responsible for transmitting and/or receiving data communicated on communication channels. Each communication unit 24 is capable of operating in parallel with other communication units in the network. A child unit 24b, such as the units associated with Peripheral #2 and Peripheral #3 in FIG. 1, is a communication unit which is capable of connecting to at least one communication unit located in the prior stage of the network hierarchy. A parent unit 24a, such as the units associated with Peripheral #1 and Peripheral #2, is a communication unit capable of connecting to one or more child units 24b located in the next stage of the hierarchy. Depending upon its position in the hierarchy, a particular communication unit 24 may be both a parent unit 24a and a child unit 24b, such as the unit associated with Peripheral #2.

Figure 2:
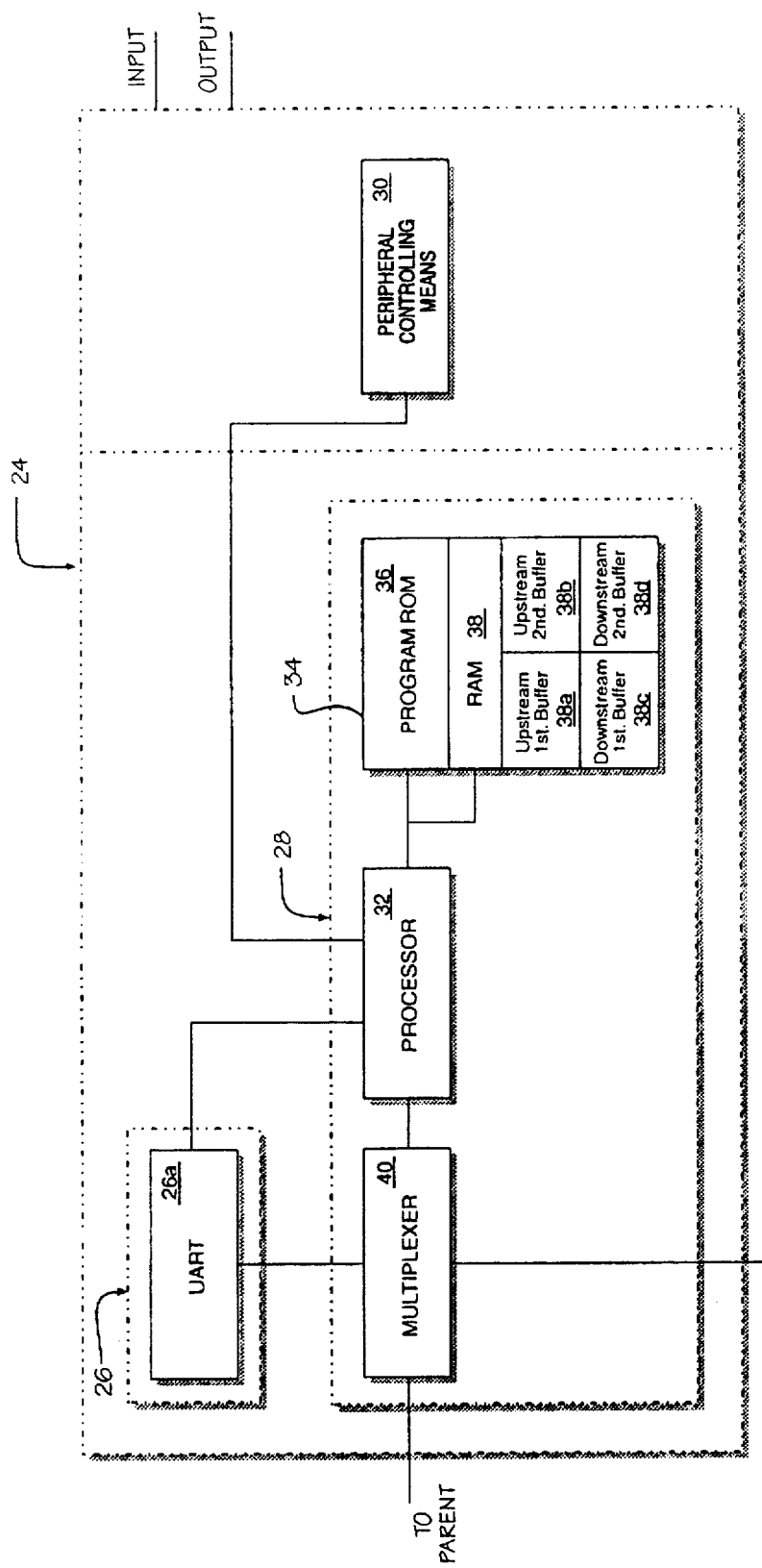
FIG. 2 is a block diagram of a communication unit and its components.

As shown in FIG. 2, a communication unit 24 preferably includes means 26 for parallel-to-serial and serial-to-parallel signaling conversion, and means 28 for controlling data received from the signaling conversion means. The communication unit may also include means 30 for specially controlling the associated peripheral. Peripheral controlling means 30 may include a microcontroller, such as an INTEL 8751, which interfaces with the peripheral through an input/output channel, or may include control logic within the communication unit for specially controlling the associated peripheral.

The preferred embodiment of the signaling conversion means 26 is a Universal Asynchronous Receiver/Transmitter (UART) 26a, such as the NS16450 UART, manufactured by National Semiconductor, although it could also be implemented in a manner known to those skilled in the art with a general-purpose processor, a memory, a parallel interface, and a clock circuit.

The data controlling means 28 within the communication unit 24 facilitates the transfer of data to, and the receipt of data from, a parent, and also facilitates the transfer of data to, and the receipt of data from, any child units. The computer facilitates the transfer of-data to, and the receipt of data from, the first stage communication unit. The preferred embodiment of the data controlling means 28 includes a processor 32 operably connected to a memory 34 (which is shown as a combination of Read Only Memory (ROM) 36 and Random Access Memory (RAM) 38), and a multiplexer 40 operably connected to both the processor 32 and the UART 26a. Stored program instructions are preferably stored in ROM 36. RAM 38 preferably includes four buffer areas: an upstream first buffer 38a; an upstream second buffer 38b; a downstream first buffer 38c; and a downstream second buffer 38d. The UART 26a may be a part of the processor 32, as is the case with the INTEL 8752. The 8752 also includes RAM and ROM. Other micro-controllers may also be employed in accordance with the present invention. Such a micro-controller may interface with multiplexer hardware, such as a Texas Instrument (TI) 74LS138 3×8 decoder, TI 74LS04 inverter, and TI 74LS125 quadruple bus buffer with tri-state outputs, to form one embodiment of multiplexer 40.

Figure 3:
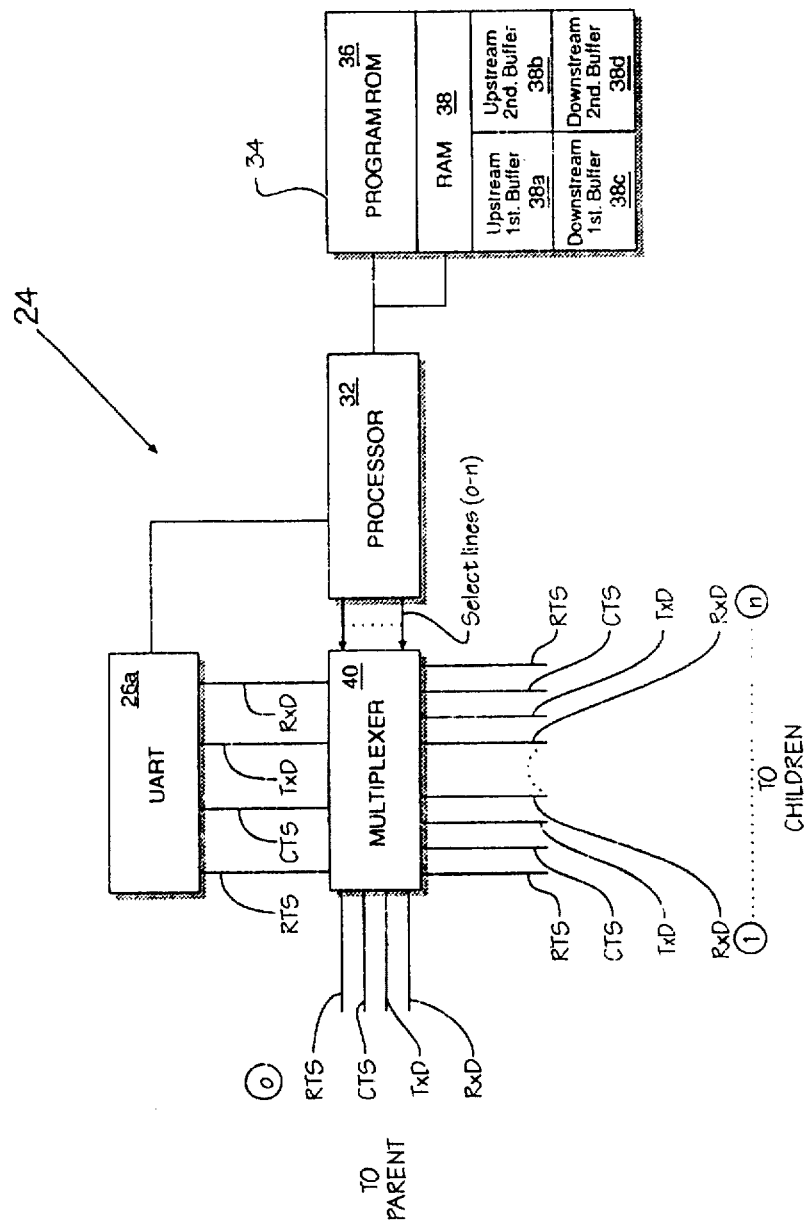
FIG. 3 is a block diagram of a portion of the communication unit shown in FIG. 2.

As shown in FIG. 3, the multiplexer 40, and therefore the communication unit 24, interfaces with at least one connecting point for connection with a parent and n connecting points for connection with child units. If a communication unit 24 is not a parent unit, then no connecting points are required for connection with child units. Under the control of the processor 32, the multiplexer 40 is capable of interleaving or simultaneously transmitting two or more messages on a communication channel to a selected communication unit 24. The preferred embodiment is to interleave two or more messages on a communication channel by time-division multiplexing. Another embodiment is to simultaneously transmit two or more messages on a communication channel by frequency-division multiplexing (e.g., via wireless communication along different frequencies). In the preferred embodiment, the communication network architecture conforms to the IBM System Network Architecture (SNA) and employs a subset of a communications line discipline or protocol known as Synchronous Data Link Control (SDLC). SNA and SDLC concepts are discussed in Computer Network Architectures and Protocols, Ed. Paul E. Green, Jr., ISBN 0-30640788-4, which is specifically incorporated herein by reference. A communication channel preferably comprises four (4) lines: Clear To Send (CTS); Request To Send (RTS); Transmit Data (TxD); and Receive Data (RxD). The lines are employed in combination with SDLC commands to perform handshaking between the computer and the first stage communication unit or between two communication units.

In practice, the communication channel between a communication unit and its parent, shown in FIG. 3, may comprise a physical cable, 0, which includes a CTS line, an RTS line, a TxD line, and an RxD line. The communication channel between the communication unit and its children may comprise n physical cables, 1 through n, wherein each cable includes a CTS line, an RTS line, a TxD line, and an RxD line. The processor 32 instructs the multiplexer 40 which cable to select so as to establish a communication channel between the communication unit and its parent, or between the communication unit and a selected child unit.

Stored program instructions in ROM 36 instruct the processor 32 on how to manage the transfer of data to, and the receipt of data from, a parent, and how to manage the transfer of data to, and the receipt of data from, any child units. The preferred embodiment is for the stored program instructions to implement message composition and decomposition, and the data communication method, both of which are described hereafter.

Message Composition

FIG. 4 depicts the preferred format for messages communicated within the communication network. The preferred format conforms to SDLC protocol. The basic message unit is referred to as a frame. A frame includes an initial flag sequence for synchronous communication purposes; an address field for identifying a node in the network; a control field for identifying the type of data contained in the frame; an information field for non-control data, which may advantageously include a length field; and a frame check sequence, such as a Cyclic Redundancy Check (CRC), for transmission error detection. The flag sequence is unnecessary in an asynchronous communication environment. Also, the information field is unnecessary if only control data is being transmitted. SDLC commands and responses are typically contained in the control field.

A frame containing an information field is referred to as an "I-frame." As used herein, an "individual" message means an I-frame which contains data from a single node, and no other node, directly or indirectly, in the network. A "composite" message means an I-frame which contains messages from more than one node in the network. A "control" message means a frame having no information field.

In the present invention, as illustrated in FIG. 5, messages may be sent from one or more peripherals 14 to the computer 12 ("upstream"), or from the computer 12 to one or more peripherals 14 ("downstream"). A peripheral 14 communicates with the computer 12 by providing data to the communication unit 24 associated with that peripheral 14. The communication unit 24, or composer, composes the data into a frame and stores the frame in its upstream first buffer. The individual message (i.e., frame) is sent from the communication unit's upstream first buffer to the upstream second buffer of its parent unit or, if the communication unit is the first stage communication unit, to the memory 18 of the computer 12. Each parent unit composes those individual or composite messages in its upstream second buffer into a single composite message, stores the composite message in its upstream first buffer, and transmits the contents to its parent. This continues until a single composite message is transmitted to the computer for processing. The computer decomposes a composite message into its constituent individual messages and then appropriately processes individual messages. The computer can also transmit messages downstream to peripherals in a reciprocal manner, that is, by composing a single composite message to be transmitted to the first stage communication unit and thereafter decomposed and distributed to designated nodes within the network. Individual communication units act as decomposers and distributors in downstream communication.

FIG. 5 depicts an example of message communication between nodes in the communication network. The example is used to illustrate both upstream and downstream communication. For purposes of the example, each peripheral, P1, P2, and P3, is shown communicating a stream of characters to and from its associated communication unit.

In upstream communication, a peripheral desiring to communicate information to the computer first sends the information to its associated communication unit. For example, in order to send the character stream "ABC" to the computer, Peripheral #3, P3, first sends the stream its communication unit. The communication unit composes the message into the format shown in FIG. 4. The composition process is preferably done in two phases.

In the first phase, the character stream from P3 is initially stored in the communication unit's upstream second buffer, in accordance with the preferred message format. If the communication unit is a parent unit, then either before or after storing the character stream in the upstream second buffer, the communication unit may also store separately identifiable messages received from child units in the upstream second buffer. In the example, P3 is not a parent unit and the upstream second buffer would preferably contain the P3 message shown in FIG. 5. In those cases where a communication unit has no children, an alternative embodiment is to employ a single upstream buffer rather than distinct upstream first and second buffers. The reason is that information from a peripheral, say "ABC" from P3, may be directly composed into a formatted message and stored in such a single upstream buffer. Since P3 has no children, no further message composition is necessary.

In the second phase, messages in the communication unit's upstream second buffer are composed into a single composite message and stored in the upstream first buffer. In general, messages in the upstream second buffer are concatenated into an information field which includes an initial length field. The length field indicates how many characters are contained within the information field, exclusive of the length field. Each character is typically represented by eight bits or one byte.

As illustrated by the message from P3, an information field is preceded by an address field (containing "P3" in the example) and a control field (containing "I" in the example to indicate information-type data). A frame check sequence, such as a CRC, may be appended to the composite message. In the preferred embodiment, the frame check sequence for a particular individual message stored in a communication unit's upstream second buffer is checked at such time as messages in the communication unit's upstream second buffer are being concatenated into an information field. If the frame check sequence for an individual message is determined to be acceptable, then the frame check sequence is removed and not stored as part of the composite message.

Once the communication unit associated with P3 has composed a composite message in its upstream first buffer, the communication unit sends the message to its parent, P2. The message from P3 is stored in P2's upstream second buffer and the two-phase composition process is repeated, resulting in the P2 message shown in FIG. 5 being stored in P2's upstream first buffer. P2's communication unit in turn sends the P2 message to its parent, P1, and repeats the process. Finally, after composing the P1 message shown in FIG. 5, P1's communication unit sends the P1 message to the computer for decomposition and processing. Thus, the result is P3, P2, and P1 communicating "ABC", "DEFG", and "HI", respectively, to the computer.

Downstream communication from the computer to peripherals may be accomplished in a reciprocal manner. The computer first composes the P1 message and sends it to P1's downstream first buffer. The communication unit associated with P1 in turn decomposes the composite message and stores individual messages in the downstream second buffer. Individual messages are then distributed to the nodes identified by the address fields of the individual messages. Further decomposition and distribution of messages occurs as necessary to communicate all messages to their designated destinations. Thus, the result is computer communicating "ABC", "DEFG", and "HI" to P3, P2, and P1, respectively.

Of course, a particular parent may receive a message from more than one child. Although not shown in FIG. 5, if the dotted line box to the left of P3 represented a peripheral, say P4, desiring to send the character stream "JKL" to the computer, then the two-phase composition process is performed. This would result in the sequence P4/I/3/J/K/L being included in P2's information field and the P2's length field being adjusted to 19. The same would analogously apply to additional children of P2 or with respect to any other parent unit in the communication network.

Data Communication Method

In operation, for all communication units in the communication network, a communication link is established between each communication unit and its parent by a predefined sequence of operations. Each communication unit in the network is capable of operating concurrently with other communication units in the network. Once a link to its parent is established, a communication unit then successively establishes communication links in a similar manner with each of its child units. Preferably the sequence of operations involve the RTS and CTS lines and the SDLC Set Normal Response Mode (SNRM), Non-Sequenced Acknowledge (NSA), Command Reject (CMDR), Reject (REJ), Receive Not Ready (RNR), and Receive Ready (RR) commands and responses (i.e., control messages), as described below.

Figure 6:
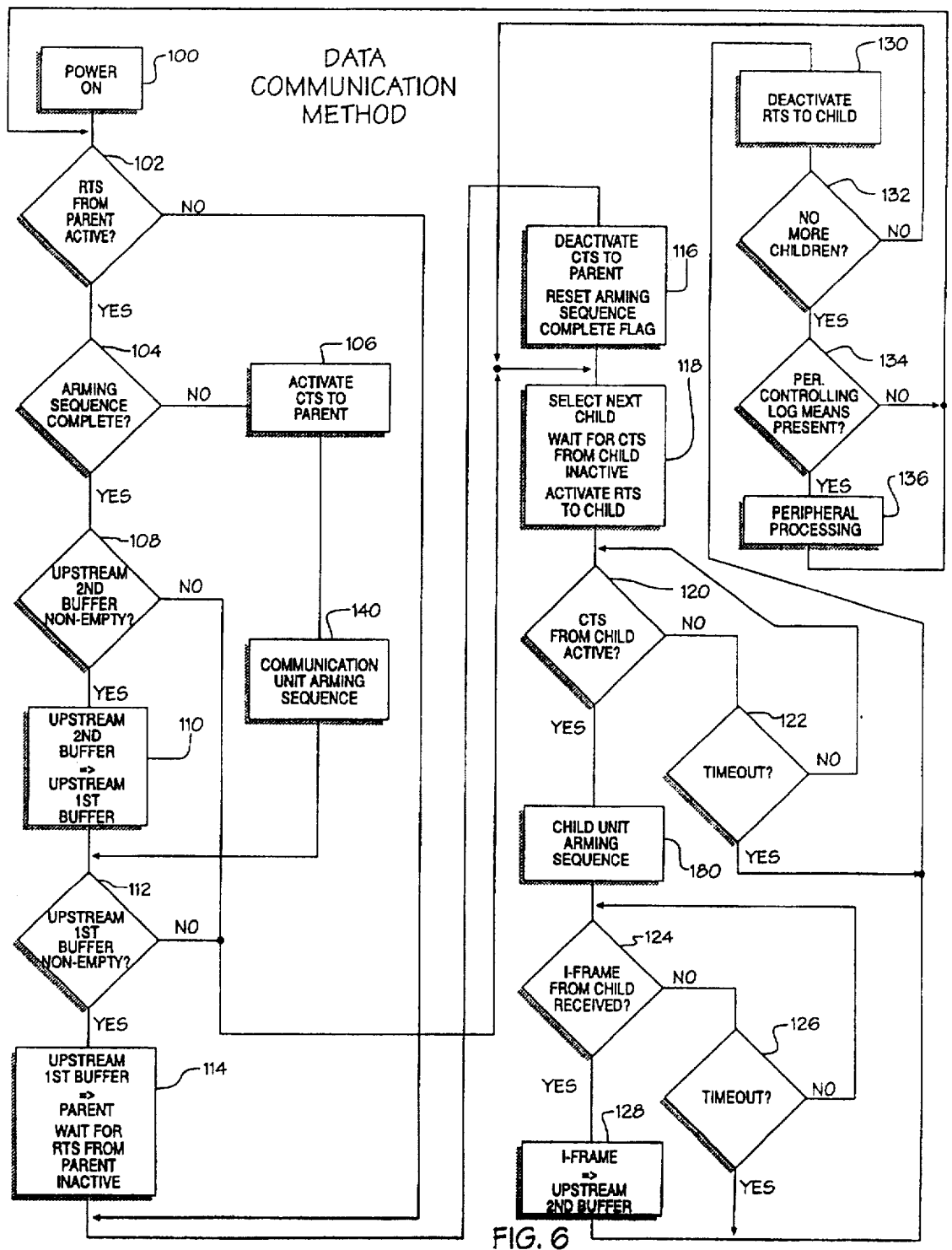
FIG. 6 is a flow diagram of the preferred embodiment of the data communication method in accordance with the present invention.

FIG. 6 depicts the preferred embodiment of the data communication method. Upon powering on of the computer system, step 100, or when all children have been serviced, step 134 or step 136, a communication unit determines whether the RTS line from its parent is active (i.e., has a positive voltage thereon), step 102, thereby determining whether the parent is requesting to send data. If so, the communication unit determines whether the communication unit arming sequence has occurred, step 104. If the arming sequence has not occurred, the communication unit activates the CTS line to the parent, step 106, thereby indicating that it is clear or permissible to send data.

Figure 9:
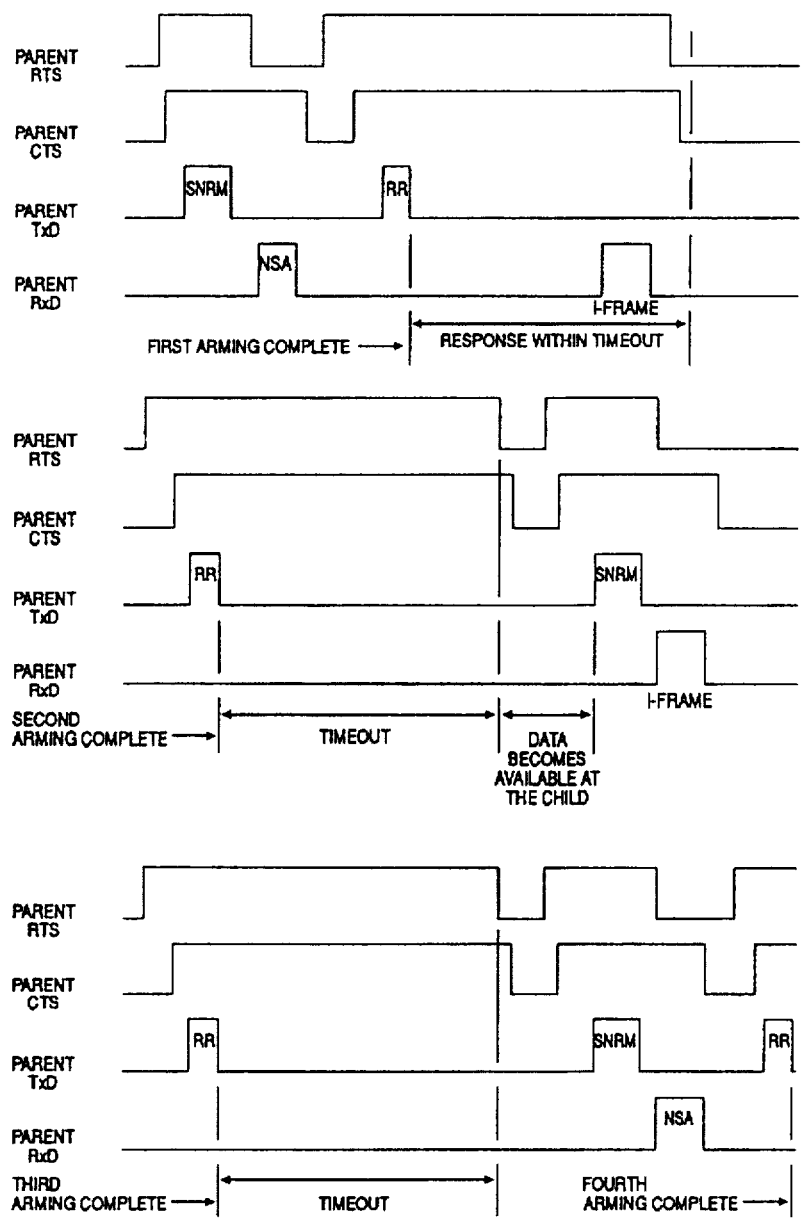
FIG. 9 is a set of timing diagrams depicting three upstream arming sequences.
Figure 10:
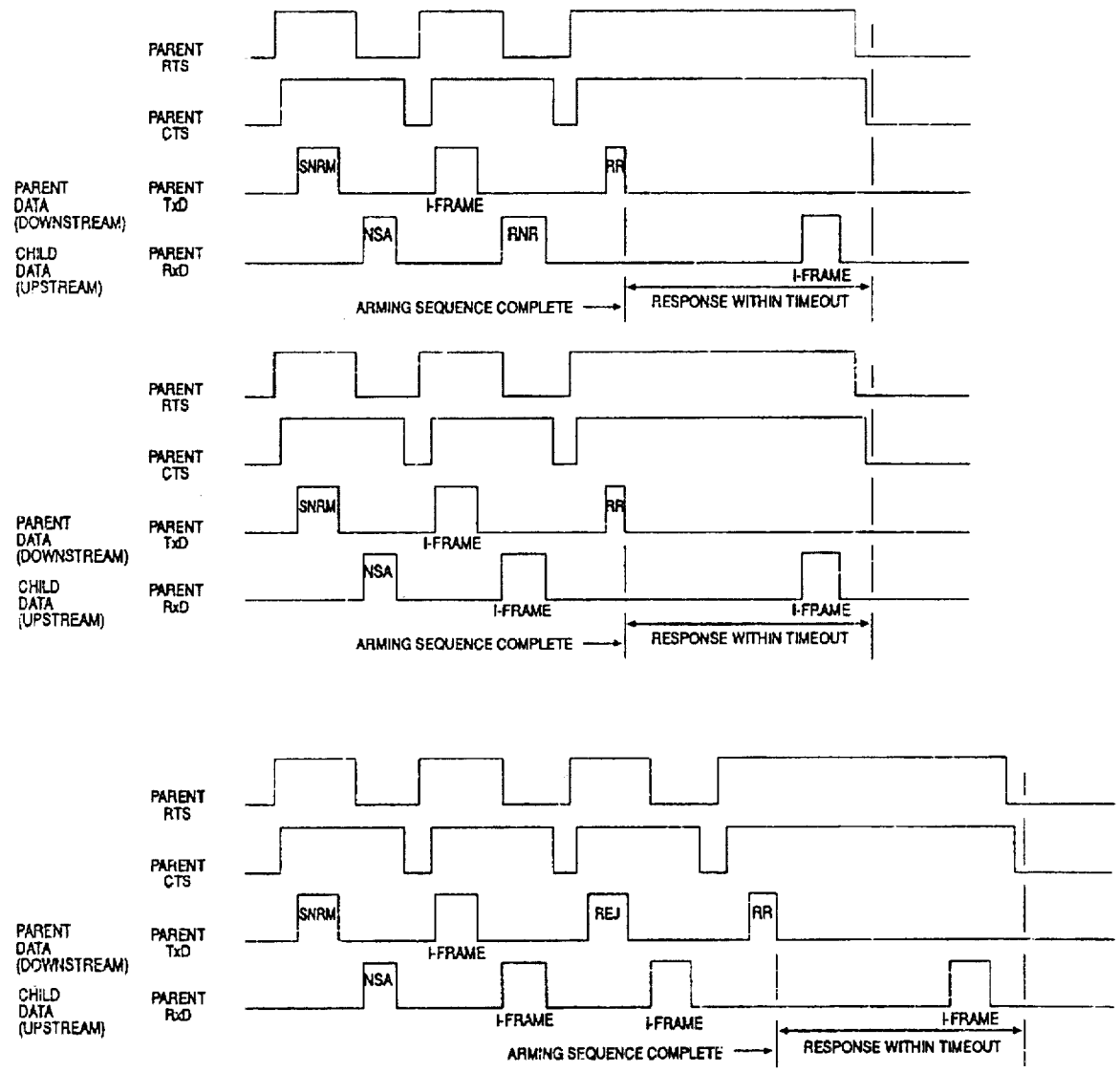
FIG. 10 is a set of timing diagrams depicting three downstream arming sequences.
Figure 11:
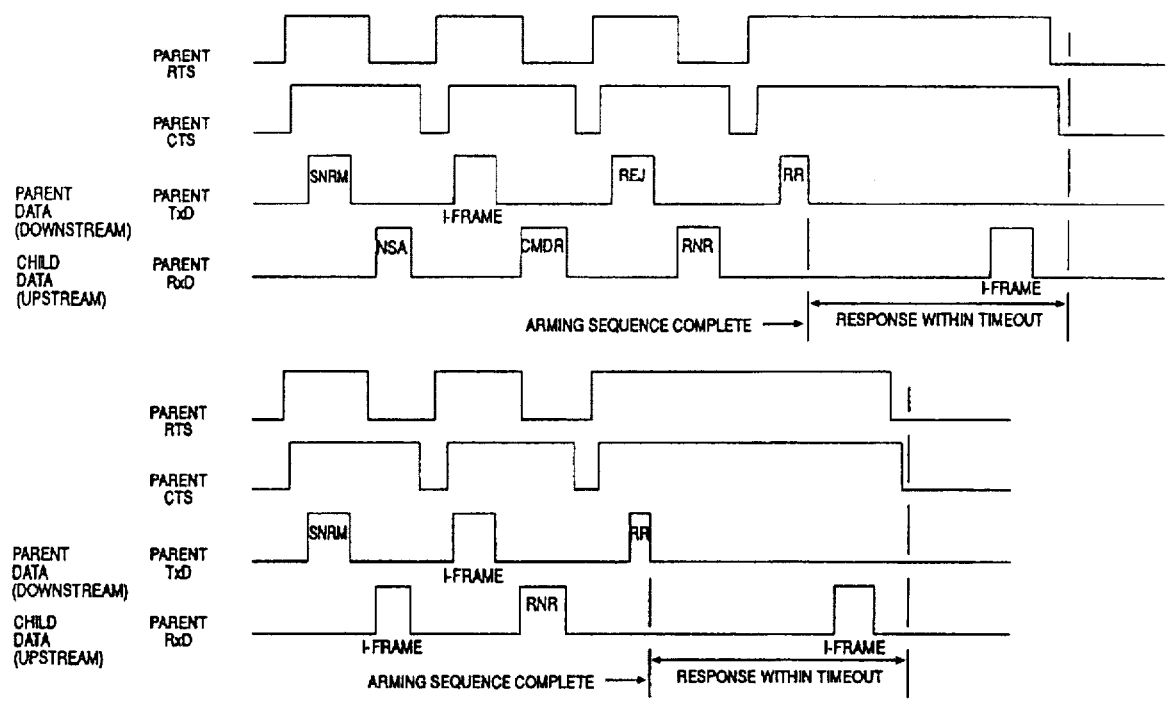
FIG. 11 is a set of timing diagrams depicting two downstream arming sequences.

Any handshaking sequence ending with an RR command being transmitted to the communication unit is considered an "arming sequence." Example arming sequences are depicted in FIGS. 9, 10, and 11. One example, shown in the first timing diagram of FIG. 9, is: the parent sends a SNRM command to the communication unit on the TxD line; the communication unit sends an NSA response to the parent on the RxD line; and the parent sends an RR command to the communication unit on the TxD line, hereafter referred to as the "SNRM/NSA/RR" sequence. Another example, shown in the first timing diagram of FIG. 10, is: the parent sends a SNRM to the communication unit on the TxD line; the communication unit sends an NSA response to the parent on the RxD line; the parent sends an I-frame to the communication unit; the communication unit sends an RNR response to the parent on the RxD line; and the parent sends an RR command to the communication unit on the TxD line, hereafter referred to as the "SNRM/NSA/I-frame/RNR/RR" sequence.

The SNRM/NSA/RR handshaking command sequence arms the communication unit so as to enable data to be communicated from the communication unit to the parent on the RxD line, within a particular period or interval of time. This time interval may vary in accordance with programmed instructions, is referred to as a programmable timeout, and may be as long as desired (e.g., milliseconds, seconds, or minutes). Typically the more child units attached to the communication unit, the smaller the programmable timeout should be so that successive establishments and breaks of communication links to each child unit do not degrade the subsystem performance of the communication unit.

The SNRM/NSA/I-frame/RNR/RR sequence also enables data to be communicated from the communication unit to the parent on the RxD line. However, in contrast to the SNRM/NSA/RR sequence, this sequence involves the parent sending an I-frame to a communication unit and requires the communication unit to immediately respond to the parent before the decomposition and distribution of the data, with either an I-frame or an RNR. As used herein, the phrases "immediately respond," "immediate response," or "immediately transmit" mean to communicate within a definite period of time (e.g., on the order of a millisecond or less). The parent initiates deactivation of its communication link to the communication unit by deactivating its RTS any time after completion of transmitting the I-frame to the child unit and before completion of receiving the I-frame or RNR from the communication unit. The communication unit upon detecting the inactive RTS line from its parent, step 114, will inactivate its CTS line after completing transmission of an I-frame or RNR to the parent, step 116. The parent, upon detecting the CTS inactive, will reactivate RTS. However, since the parent can reactivate RTS at any time, the communication unit makes use of this time to service each of its child units in turn for the purpose of collecting data, steps 118 through 132. Once the parent activates RTS and the communication unit in turn detects this, at step 102, after having serviced its children, then the communication unit activates the CTS line to the parent, step 106. The parent now sends the RR command, completing the SNRM/NSA/I-frame/RNR/RR sequence.

After an arming sequence is complete, the parent holds RTS active and waits for the communication unit to respond with a message within the programmable timeout. Within this same timeout period, if the communication unit has no data to immediately transmit back to the parent, the communication unit is free to service each of its child units in turn for the purpose of collecting data in its upstream second buffer, and sending any composite data in its upstream first buffer to the parent before the parent's programmable timeout expires.

Still another form of the communication unit arming sequence, illustrated in the second and third timing diagrams of FIG. 9, referred to as the "SNRM/I-frame/RR" sequence, is: the parent sends a SNRM command to the communication unit on the TxD line; the communication unit sends an I-frame response to the parent on the RxD line; and the parent sends an RR command. This type of arming sequence occurs when the parent's programmable timeout expired on a previous arming sequence and the communication unit managed to gather a message in the upstream first buffer from its children just before the parent sent a SNRM to the communication unit to start a new arming sequence. The response to the SNRM is in fact the message that exists in the upstream first buffer in lieu of an NSA. Loading the upstream first buffer with an NSA to respond to the SNRM would overwrite the message thereby causing loss of data. An alternative embodiment is to create a temporary buffer to hold the message during a normal SNRM/NSA/RR sequence, then to move the contents of the temporary buffer to the upstream first buffer for transmission to the parent.

The simplest form of the communication unit arming sequence, referred to as the "RR" sequence, occurs when the parent simply sends an RR command to the child unit on the TxD line. This sequence is only valid if the parent's programmable timeout did not expire on the previous sequence and is used by the parent whenever the communication unit has responded with some type of data such as an NSA, CMDR, RNR, or I-frame, as shown in the second timing diagram of FIG. 9. In contrast, following expiration of a parent programmable timeout, the parent must initiate an arming sequence with a SNRM which requires an immediate response (such as an NSA) by the communication unit. If an immediate response does not arrive from the communication unit, the parent can then poll its next child. Since the programmable timeout designated for a response to an RR is several orders of magnitude greater than that of an immediate response, it would not make sense to initiate an arming sequence with an RR command to a child which has a malfunctioning UART and is unable to respond, for this would introduce unnecessary delays in obtaining data from properly functioning children which are attached to the communication unit.

An armed communication unit in the network seeking to send a message upstream will first attempt to send any currently held data up to its parent, then will query each of its children for new data. In the preferred embodiment, the communication unit determines whether data in its upstream first buffer is ready to be sent to its parent, step 112. If so, the communication unit transmits data in its upstream first buffer to the parent unit's upstream second buffer or to the computer's memory, step 114. More particularly, the communication unit's UART converts data in the upstream first buffer from parallel-to-serial form and transmits the data to the parent on the RxD line. The parent receives the data and converts it from serial-to-parallel form. The parent thereafter stores the data in the parent's memory. If there is no data in the upstream first buffer to be sent to the parent, step 112, or if there is no data in the upstream second buffer, step 108, then the communication unit queries its children for incoming data, starting at step 118.

The communication unit determines whether data in its upstream first buffer is ready to be sent to the parent by: verifying that the communication unit's upstream second buffer has data, in the form of one or more messages, therein, step 108; composing that data into a single decomposable message; and storing that single message into the upstream first buffer, step 110. The existence of data in the upstream first buffer means that it is ready to be sent to the parent, step 112.

Once the communication unit has transmitted data to its parent, it waits for the RTS line to the parent to become inactive, step 114. Once the RTS line becomes inactive, or in the event it was determined to be inactive at step 102, the communication unit then deactivates the corresponding CTS line which disarms the communication unit, step 116. An indicator may be set within the communication unit to indicate that it has been disarmed, step 116.

If the communication unit is a parent unit, that is, it has children, then the communication unit begins servicing its child units after it has become disarmed through steps 114 and 116, or after it has become armed and either of the upstream buffers are empty, steps 108 or 112. The communication unit polls each child unit in turn in order to manage the transfer of data to, and the receipt of data from, each child unit. For example, for a communication unit having n child units, where n>0, the communication unit would select a multiplexed connection, service the child unit attached to that connection, and repeat these two steps until each child had been serviced. Typically this is done in iterative fashion, 1 through n.

Once a communication unit has selected a multiplexed connection for a particular child unit, the communication unit waits until the CTS line to the child unit becomes inactive, step 118. Since the time it takes to inactivate the CTS in a given communication unit can vary due to interrupts from peripheral controlling means, it is possible that a communication unit can fail to inactivate its CTS before the parent tries to activate RTS again. Thus, the parent is made to wait until CTS from the child unit is inactive, step 118, before activating RTS to a child unit. The communication unit then activates the RTS line to the. child unit, thereby requesting permission to send data, step 118. The communication unit then determines whether the CTS line to the selected child is active, step 120, thereby determining whether the child unit is ready for an arming sequence. The child unit is considered armed if the communication unit ends the handshaking command sequence with an RR command to the child unit. All the command sequences used to arm the.communication unit by the parent apply to the child unit as well. For example, the child unit is considered armed if: the communication unit sends a SNRM command to the child unit on the TxD line; the child unit sends an NSA response to the. communication unit on the RxD line; and the communication unit sends an RR command to the child unit on the TxD line. In similar fashion to the SNRM/NSA/RR sequence of the communication unit arming sequence, this sequence arms the child unit so as to enable the child unit to communicate to the communication unit on the RxD line, within a particular programmable timeout. The SNRM/NSA/I-frame/RNR/RR sequence for arming the communication unit may also be employed to arm a child unit. As with the communication unit arming sequence, I-frame data flow going downstream is an integral part of the arming sequence whereas I-frame data flow going upstream occurs anytime after the arming sequence is complete (i.e., I-frame data flow upstream can but is not required to be an immediate response to a parent's RR command).

Within the programmable timeout, step 126, data is received by the communication unit from the selected child unit, step 124, in the following manner: the child unit's UART converts data in the child unit's upstream first buffer from parallel-to-serial form and transmits the data to the communication unit on the RxD line; the communication unit's UART receives the data and converts it from serial-to-parallel form; and the data is stored in the communication unit's upstream second buffer, step 128. Thereafter, or in the event that steps 120 or 124 timeout (see steps 122 and 126, respectively), the child unit is disarmed by deactivating the RTS line from the communication unit to the child, step 130.

The process of servicing child units continues until each child has been serviced, step 132. Once all the children have been serviced, any peripheral processing is performed, and the process repeats itself beginning with step 102. This process may be used asynchronously by all communication units in the communication network.

COMMUNICATION UNIT ARMING SEQUENCE

Figure 7:
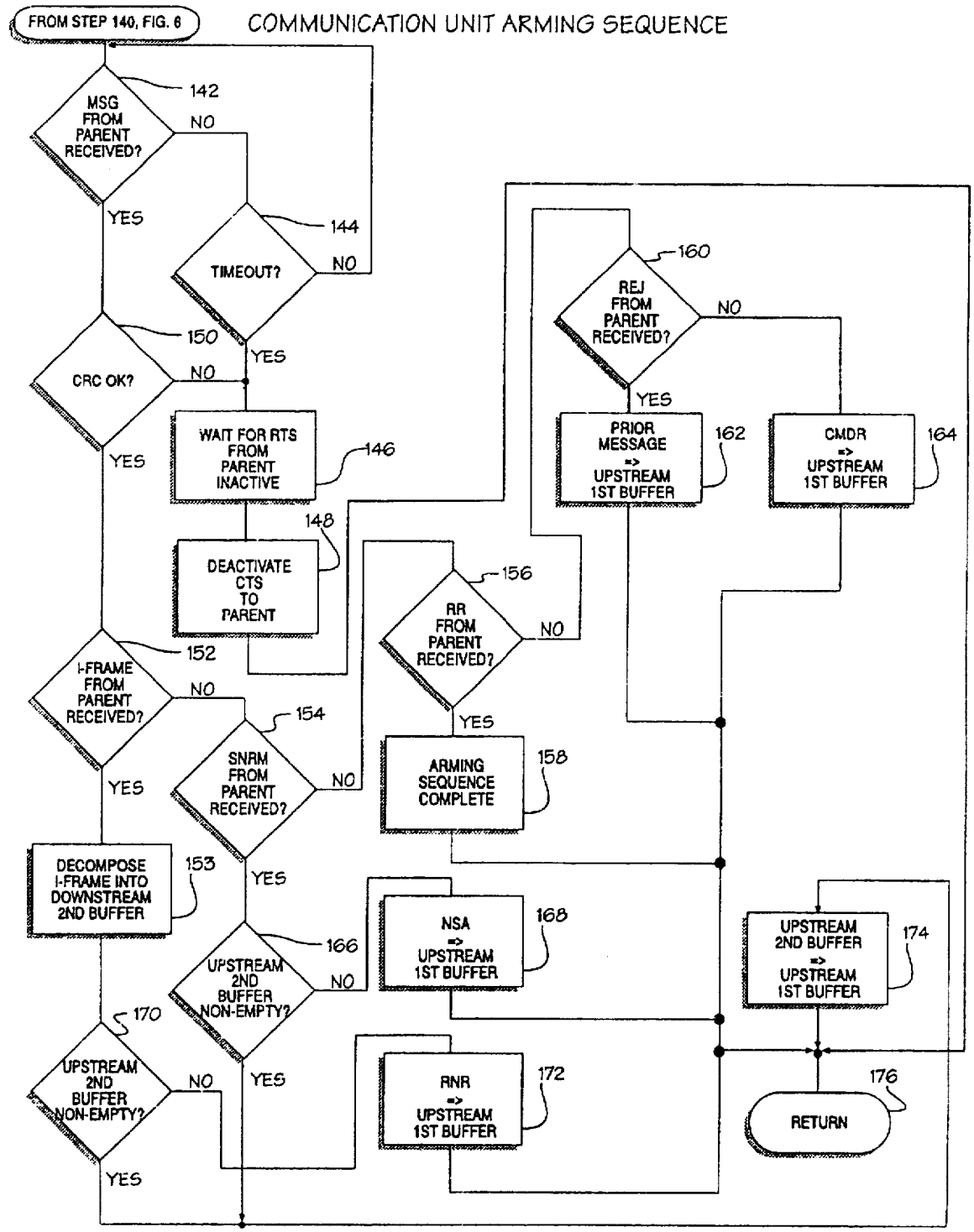
FIG. 7 is a flow diagram of the communication unit arming sequence portion of the data communication method shown in FIG. 6.

As depicted in FIG. 7, the communication unit arming sequence, step 140, may be more involved than the SNRM/NSA/RR handshaking command sequence described above. Initially, the communication unit determines whether a message has been received from its parent, step 142. If no message is received within the timeout, step 144, then the communication unit waits for the RTS line to its parent to become inactive, step 146, deactivates the CTS line to the parent, step 148, and returns to the data communication method, following step 176, at step 112, shown in FIG. 6. If a message is received, then, preferably, it is checked for errors. For example, a CRC code may accompany each message so that each message may be verified against its CRC, step 150.

In the preferred embodiment, a message may contain either control data, such as SDLC commands and responses, or non-control data, such as data collected from the computer or-the peripherals.

If the message received from the parent in downstream first buffer is non-control data, then the communication unit, or decomposer, decomposes that message into the downstream second buffer, step 153, and determines whether the communication unit's upstream second buffer has data in the form of one or more messages, therein, step 170. If so, the communication unit composes that data into a single decomposable message, and stores that single message into the communication unit's upstream first buffer, step 174. If not, an RNR response is stored in the upstream first buffer to permit indication of a temporary busy condition, step 172.

If the message received from the parent is control data, then the communication unit determines what type of control data was received and responds accordingly. The communication unit first determines whether a SNRM command was received, step 154. If so, the communication unit checks its upstream second buffer to determine whether there is data, in the form of one or more messages, therein, step 166. If the upstream second buffer contains data, then that data is composed into a single decomposable message and stored into the communication unit's upstream first buffer, step 174, otherwise, an NSA response is stored in the upstream first buffer in order to permit acknowledgment of the prior SNRM command. After sending either response to a SNRM command, the communication unit expects the next message from the parent to be either an RR response or an I-frame, under non-error conditions.

If the message received from the parent is control data and is not a SNRM command, the communication unit next determines whether an RR command was received, step 156. If so, this indicates that the arming sequence is complete and an indicator is set to indicate that condition, step 158. If an RR command was not received, the communication unit next determines whether a REJ command was received, step 160. If so, then the prior message transmitted to the parent is stored into the communication unit's upstream first buffer, step 162, otherwise, a CMDR response is stored in the upstream first buffer to indicate that the control data received by the communication unit is not recognized, step 164.

Following steps 148, 158, 162, 164, 168, 172, and 174, control is returned to the main data communication method, following step 176, at step 112, shown in FIG. 6.

CHILD UNIT ARMING SEQUENCE

Figure 8:
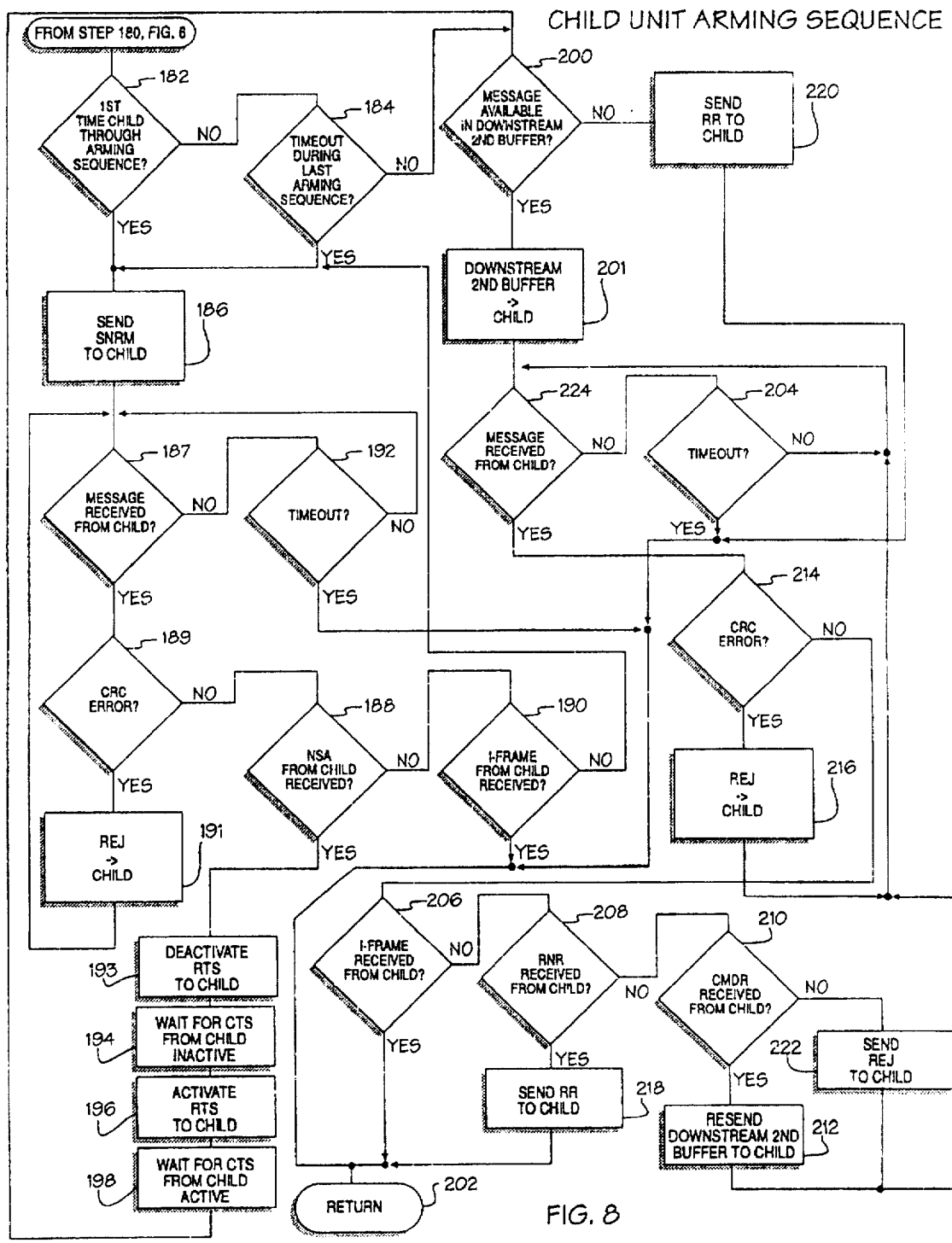
FIG. 8 is a flow diagram of the child unit arming sequence portion of the data communication method shown in FIG. 6.

As shown in FIG. 8, in order to service its children, a communication unit must first arm a selected child unit, step 180. The communication unit first checks to see if this is the first time the selected child unit has been through the arming sequence, step 182. If it is not, then the communication unit determines whether a timeout occurred during the last arming sequence, step 184. Step 200 is performed if no timeout occurred last time. If it is the first time through the arming sequence, or it is not and a timeout occurred last time, then the communication unit sends a SNRM command to the child unit, step 186. The communication unit then awaits receipt of a message from the selected child unit, step 187, within a programmable timeout, step 192. If a message with a valid CRC is received from the child unit within the timeout, step 189, the message is checked for type NSA, step 188. However, if the CRC was invalid, a REJ is sent to the child unit, step 191, which will prompt the child to resend its last message. If the message received from the child unit in response to the SNRM command was neither an NSA nor an I-frame response, step 190, then the child has not followed protocol, and a SNRM is sent again to the child unit, step 186. If the child continues to disobey protocol, eventually the programmable timeout will expire and control will be returned, step 202, to the main data communication method, at step 124, FIG. 6.

If an NSA response is received from the child unit within the timeout, then the communication unit deactivates RTS to the child, step 193, waits for the child to deactivate the CTS line, step 194, activates the RTS line to the child, step 196, waits for the child to reactivate the CTS line, step 198, and finally sends either an RR command to complete the arming sequence of the child unit, step 220, or sends the contents of the downstream second buffer to the child, step 201, depending on whether or not a non-control message is available in the downstream second buffer, step 200.

After step 220, or if a timeout occurs while awaiting a response, step 204, or if a timeout occurs while awaiting a response to the SNRM command, step 192, or if the response to the SNRM command, step 186, was an I-frame, step 190, then control is returned, step 202, to the main data communication method, at step 124, FIG. 6.

If the non-control data contents of the downstream second buffer are sent to the child, step 201, the communication unit awaits a response from the child in the form of an I-frame, step 206, an RNR, step 208, or a CMDR, step 210. If the programmable timeout expires, step 204, while waiting for one of these responses, control is then returned, step 202, to the main data communication method, at step 124, FIG. 6.

If a CRC error is detected on a received message from the child, step 214, the communication unit will send a REJ command to the child, step 216, which will inform the child to resend its last message. If an I-frame is received from the child without CRC errors, step 206, control is then returned, step 202, to the main data communication method, at step 124, FIG. 6. If an RNR is received from the child, step 208, the communication unit will send an RR command to the child to complete the arming sequence, step 218. If a CMDR is received from the child unit, the communication unit will resend the downstream second buffer to the child, step 212.

If an unrecognizable response is received from the child, the communication unit will send a REJ command to the child, step 222.

Of course, many modifications and adaptations to the present invention could be made to advantage without departing from the spirit of this invention. Further some features of the present invention could be used without corresponding use of other features. Accordingly, this description should be considered as merely illustrative of the principles of the present invention and not in limitation thereof.

We claim:

1. Method for data communication between a computer and at least three peripherals connected along a plurality of communication channels, the peripherals being connected in a hierarchy wherein at least one peripheral, a composer, has at least one parent and at least one child, comprising the steps of:

for at least one composer,
- (a) establishing a communication link between the composer and a parent;
- (b) transmitting a first composite message, if any, from the composer to the parent;
- (c) for at least one child within a set of children,
  - (i) establishing a communication link between the composer and a child;
  - (ii) receiving a message, if any, from the child;
  - (iii) for each additional selected child, if any, repeating steps (c)(i) through (c)(ii), wherein a set of messages from a subset-of the set of children may be received;
- (d) composing the set of messages from step (c) into a second composite message; and
- (e) repeating steps (a) through (d) until terminated, wherein the second composite message of step (d) becomes the first composite message of step (b); whereby the composer is capable of composing messages independently of at least one indirectly connected peripheral in the hierarchy, and is also capable of composing messages asynchronously with at least one other peripheral in the hierarchy.

2. Method according to claim 1, wherein step (a) includes receiving a SNRM command from the parent; sending an NSA response to the parent; and receiving an RR command from the parent.

3. Method according to claim 1, wherein step (b) includes converting a first composite message stored in a memory from a parallel representation to a serial representation and transmitting the serial representation from the peripheral to the parent.

4. Method according to claim 1, wherein, for each selected child, step (c) includes: sending a SNRM command to the child; receiving an NSA response from the child; sending an RR command to the child; receiving a serial representation of a non-control message from the child; converting the serial representation into a parallel representation; and storing the parallel representation in a memory.

5. Method according to claim 1, wherein, for each selected child, step (c) includes: sending a SNRM command to the child; receiving an NSA response from the child; sending an I-frame response to the child; receiving an RNR response from the child; sending an RR command to the child; receiving a serial representation of a non-control message from the child; converting the serial representation into a parallel representation; and storing the parallel representation in a memory.

6. Method according to claim 1, wherein, for each selected child, step (c) includes: sending a SNRM command to the child; receiving an I-frame response from the child; sending an RR command to the child; receiving a serial representation of a non-control message from the child; converting the serial representation into a parallel representation; and storing the parallel representation in a memory.

7. Method according to claim 1, wherein each message in the set of messages includes indicia for indicating which child sent the message, and step (d) includes: composing the messages in the set of messages in a decomposable second composite message; associating with the second composite message indicia for indicating the peripheral; and storing the second composite message in a memory wherein it becomes the first composite message.

8. Method for data communication between a computer and at least three peripherals connected along a plurality of communication channels, the peripherals being connected in a hierarchy wherein at least one peripheral, a decomposer, has at least one parent and at least one child, comprising the steps of:

for at least one decomposer,
- (a) establishing a communication link between the decomposer and a parent;
- (b) receiving a composite message, if any, from the parent;
- (c) decomposing the composite message into one or more messages;
- (d) for at least one child of the decomposer,
  - (i) establishing a communication link between the decomposer and a child;
  - (ii) transmitting a selected one of said one or more messages to the child;
  - (iii) for each additional selected child of the composer, if any, repeating steps (d)(i) through (d)(ii); and
- (e) repeating steps (a) through (d) until terminated; whereby the decomposer is capable of decomposing messages independently of at least one indirectly connected peripheral in the hierarchy, and is also capable of decomposing messages asynchronously with at least one other peripheral in the hierarchy.

9. Method for data communication between a computer and at least three peripherals connected along a plurality of communication channels, the peripherals being connected in a hierarchy wherein at least one peripheral has at least one parent and at least one child, comprising the steps of:

for at least one peripheral having at least one parent and at least one child,
- (a) establishing a communication link between the peripheral and a parent;
- (b) communicating a first composite message, if any, between the peripheral and the parent;
- (c) for at least one child of the peripheral,
  - (i) establishing a communication link between the peripheral and a child;
  - (ii) communicating a second composite message, if any, between the peripheral and the child;
  - (iii) for each additional selected child of the peripheral, if any, repeating steps (c)(i) through (c)(ii);
- (d) processing messages at the peripheral; and
- (e) repeating steps (a) through (d) until terminated; whereby the peripheral is capable of processing messages independently of at least one indirectly connected peripheral in the hierarchy, and is also capable of processing messages asynchronously with at least one other peripheral in the hierarchy.

* * * * *